Oct. 28, 1958 E. LESHNER 2,858,131

TAPE METERING DEVICE

Filed April 25, 1955 3 Sheets-Sheet 1

INVENTOR.
ERVIN LESHNER
BY
Ralph K. Bonell
AGENT

Oct. 28, 1958 E. LESHNER 2,858,131

TAPE METERING DEVICE

Filed April 25, 1955 3 Sheets-Sheet 2

INVENTOR.
ERVIN LESHNER
BY
Ralph K. Bonell
AGENT

INVENTOR.
ERVIN LESHNER
BY
Ralph K. Bonell
AGENT

United States Patent Office 2,858,131

Patented Oct. 28, 1958

2,858,131

TAPE METERING DEVICE

Ervin Leshner, Philadelphia, Pa., assignor to Burroughs Corporation, Detroit, Mich., a corporation of Michigan Application April 25, 1955, Serial No. 503,714

3 Claims. (Cl. 271—2.4)

The present invention relates to tape feeding and control mechanisms therefor and more particularly to an intermittent tape feed in association with means for marking predetermined data, indicia, perforations or the like upon a tape.

An object of the present invention is to provide an improved controlled tape feed operating in timed relation with a printing or other data marking means wherein the tape feed is at rest when the marking means operates, the arrangement being such that a high speed step-by-step operation is possible.

Another object of the invention is to provide an improved intermittent feed for tape wherein excessive tension strains upon a tape fed from a source are eliminated, thereby avoiding damage to a tape while being fed.

Another object is to provide an improved tape step-by-step feed mechanism wherein means are provided for alternately clamping the tap at two locations in association with separate feeding and withdrawing means, the feeding means functioning while one tape clamp operates and the withdrawing means functioning while the other clamp operates, whereby it is possible to make recordings on the tape while it is at rest and to feed the tape in increments occurring at a rate of the order of at least ten cycles per second.

A further object is to provide a high speed intermittent feed for tapes while being marked with data to be tape recorded, wherein stress upon the tape, as fed, is kept at a minimum in starting.

A further object is to provide a high speed intermittent feed for tapes wherein over-running due to inertia is avoided in the stopping position.

A still further object is to provide means for positioning a tape in operative relation to a marking device for high speed recording of data through the medium of a novel intermittent tape feed mechanism which includes a plurality of step-by-step units arranged and controlled in timed relation for successive rapid tape marking.

Further objects will hereinafter appear.

In the accompanying drawings Fig. 1 is a schematic side elevation of a tape control embodying one form of the present invention;

Figure 1:
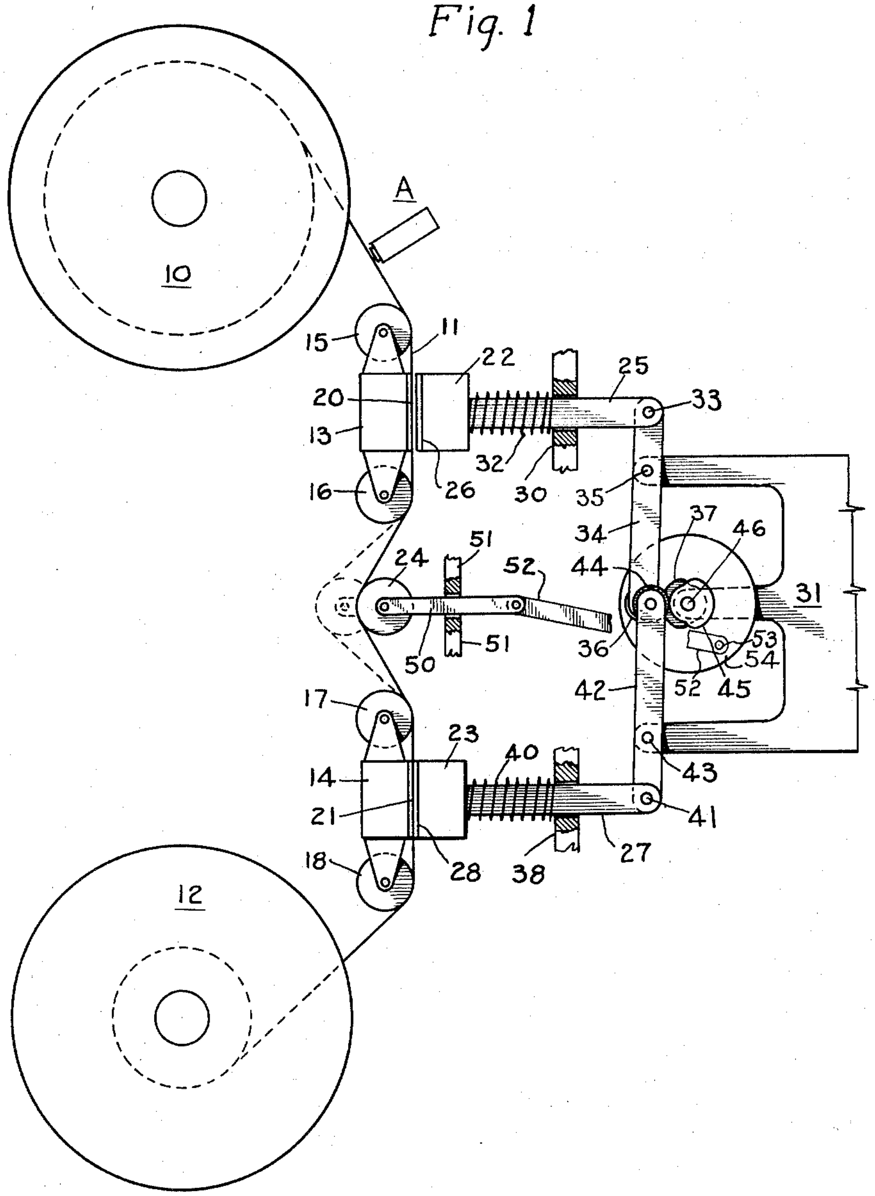
Figure 2:
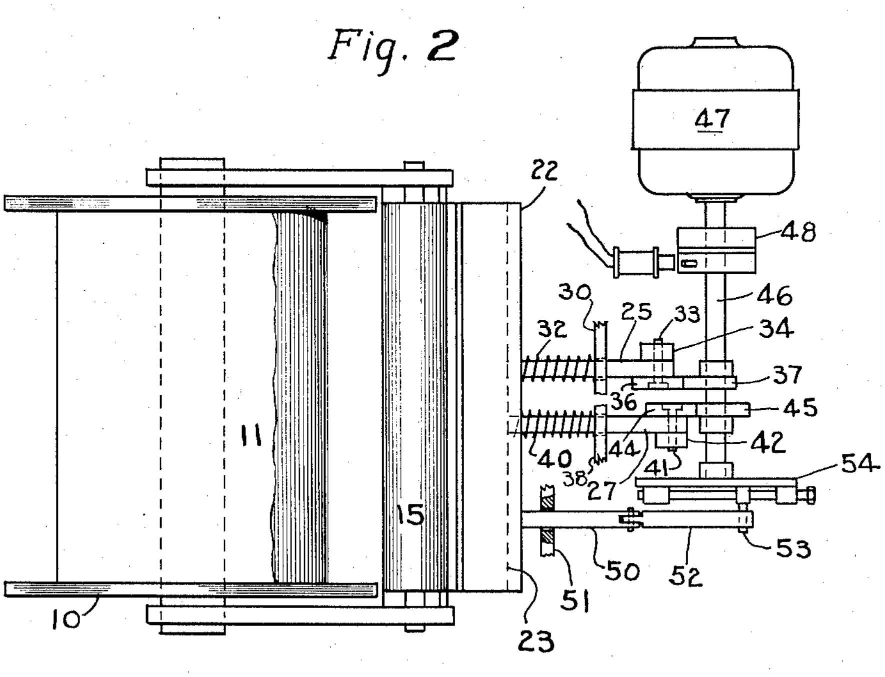
Fig. 2 is a plan view of the same, showing the positions of the cam operated members exaggerated in relation for better understanding of the assembly.
Figures 3, 4:
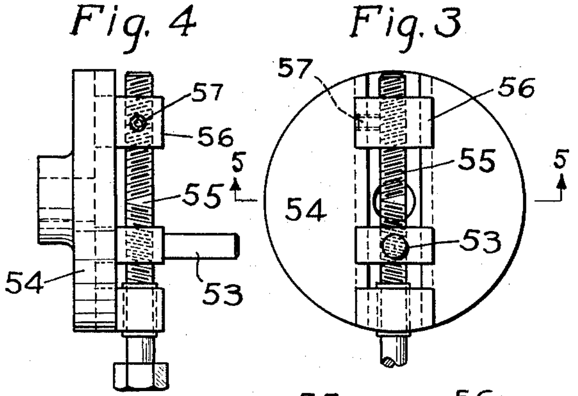
Fig. 3 is a detail face view on an enlarged scale of one form of tape feed adjustment.
Fig. 4 is a side view of the parts shown in Fig. 3.

Referring to Figs. 1 to 3, a tape feed control is shown as associated with a tape reel 10 from which the tape 11 is drawn and wound upon a take-up reel 12, which latter is rotated by any suitable driving mechanism preferably a continuous running slip drive, not shown. While the fed material is in the form of a tape, the tape per se is paper, metal, plastic, or other material upon which data can be printed, perforated, magnetically applied, or otherwise impressed as a component part of the prepared tape.

The data is applied to the tape 11 as it passes the marking station A, which may be of any known type of apparatus for printing, punching, or recording selected data by perforations, impressions, code readings, or other sensing means for reading, reproduction or otherwise. In accordance with the present invention, the tape 11 is controlled by an intermittent feed wherein the record is made while the tape is at rest, though this should not give the impression of a slow speed operation because primarily a high speed step-by-step operation is desired, preferably of the order of approximately ten cycles per second.

For supporting or guiding the tape 11, it is arranged to be drawn across the respective faces of two spaced-apart fixed blocks 13 and 14, here shown as generally in alignment, the block 13 having oppositely disposed guide rollers 15 and 16 permitting the tape, as fed, to ride in contact with a block face. Likewise the block 14 has oppositely disposed guide rollers 17 and 18 so mounted as to permit the tape 11 to ride in contact with a tape disposed face of the block. Preferably the blocks 13 and 14 are respectively surfaced on the tape disposed faces with friction pads 20 and 21 for a purpose later to be described.

As a means for causing the desired fast operating step-by-step feeding of the tape, a novel control is provided comprising a clamp member 22 mounted in juxtaposed relation to the block 13, a second clamp member 23 mounted in juxtaposed relation to the block 14, and a reciprocable tape engaging roller 24 disposed to contact the tape intermediate the clamping members. The clamp member 22 is carried by an arm 25 for reciprocating it into and out of contact with that portion of a tape which is travelling across the friction pad 20. The contact face of the member 22 is faced with a friction pad 26. The clamp member 23 carried by an arm 27 for reciprocating it into and out of contact with that portion of a tape which is travelling across the friction pad 21. This contact face of the member 23 is also surfaced with a friction pad 28.

For reciprocating the clamping block 22, the arm 25 passes through an aperture of an extension 30 of a fixed frame 31, for linear sliding movement, and carries a coiled spring 32 interposed between the extension 30 and the block 22 in order to bias the block 22 toward its gripping portion against the tape 11. The free end of the arm 25 is pivotally attached by a pin 33 to a rock lever 34, which is pivoted at 35 to the fixed frame 31, and terminating in a follower 36 riding in contact with a timing cam 37. Thus the lever 34 is rocked by the cam 37 to withdraw the block 22 from tape engagement and compresses the spring 32 against the fixed extension 30 so that when the follower 36 rides into the low point of the cam 36 the block 22 is spring pressed against the tape to stop the feed. This biasing action also maintains the cam roller 36 in proper contact with its cam 37.

In like manner the clamping block arm 27 passes through an aperture of another extension 38 of the frame 31 for linear sliding movement and carries a coiled spring 40 interposed between the extension 38 and the block 23 in order to bias the block 23 toward its gripping position against the tape 11. The free end of the arm 27 is pivotally attached by a pin 41 to a rock lever 42, which is pivoted at 43 to the fixed frame 31, and terminates in a follower 44 riding in contact with a timing cam 45. Thus the lever 42 is rocked by the cam 45 to withdraw the block 23 from tape engagement and compresses the spring 40 against the fixed extension 38, so that when the follower 44 rides into the low point of the cam 45, the block 23 is spring pressed against the tape to stop the feed. This biasing action also maintains the cam roller 44 in proper contact with its cam 45.

The two cams 37 and 45 are keyed to a shaft 46 in 180° degree relation, that is, on one half revolution of the shaft 46, one clamp member will be in withdrawn position while the other clamp member will be in clamping position. Upon the other half revolution of the shaft the clamping action of the members will be reversed. In other words the clamping members 22 and 23 are alternately brought to tape gripping or stop feed position, the one functioning at one point in the length of the tape and the other functioning at another point in the length of the tape, the spacing of these two points being such as will permit a predetermined length of the tape to be drawn as a loop between the two points. The shaft 46 is driven by a motor 47 for either continuous operation, or for cycle control operation by interposing a single revolution clutch 48, which latter is signal controlled from the recording station.

For drawing a predetermined length of tape 11 across the space between the two clamping members 22 and 23, the tape engaging roller 24 is carried by a link 50 linearly slidable in a fixed support 51, and actuated by an arm 52 pivoted to a pin 53, eccentrically carried by a disc 54 keyed to the shaft 46. As here shown, the pin 53 is threaded upon a lead screw 55 having right and left threads respectively controlling the pin 53 and a counterweight 56 having a dove-tail sliding mounting with disc 54. The dove-tail also mounts the pin 53 for sliding movement. Thus the throw of the eccentric pin 53 can be adjusted radially with respect to the axis of the shaft 46, while the counter-weight 56 follows the adjustment in an opposite direction to maintain proper balance of the parts and prevent disturbing vibration. When adjusted for the selected stroke of the roller 24, the counter-weight 56 is locked in place by a set screw 57.

The operation of the device shown in Figures 1 to 5 will be described in its broader aspect of continuous operation rather than the more specific signal controlled cycles necessary for proper association with certain types of recording units. With the tape 11 initially threaded into position for feeding from the reel 10 to the take-up reel 12, and in operative position to receive markings from the recording station, the motor 47 is started so the cycle operates as follows, assuming the clamp member 22 is open and the clamping member 23 is in gripping position against the tape 11. The eccentric controlled roller 24 advances to intercept the tape and push it laterally to draw the predetermined length of tape from the reel 10 with the applied marking thereon as delivered from the recorder A. This action of the pushing roller 24 is under control of the eccentric motion imparted by the disc 54 with its associated parts. With the advance of the tape for the selected feed, the cam 45 rocks the lever 42 to withdraw the clamping member 23, to release the tape. Simultaneously the low point of the cam 37 allows the compressed spring 32 to shift the clamping member 22 against the tape and hold it while the take-up reel 12 withdraws the measured loop formed by the action of the eccentric controlled roller 24. Preferably, but not necessarily, the feed step is of the order of one inch per section with ten cycle operation per second of the step-by-step control. This high speed operation is made possible by the alternate action of the clamping members functioning with two independent tape feed mechanisms.

Figure 6:
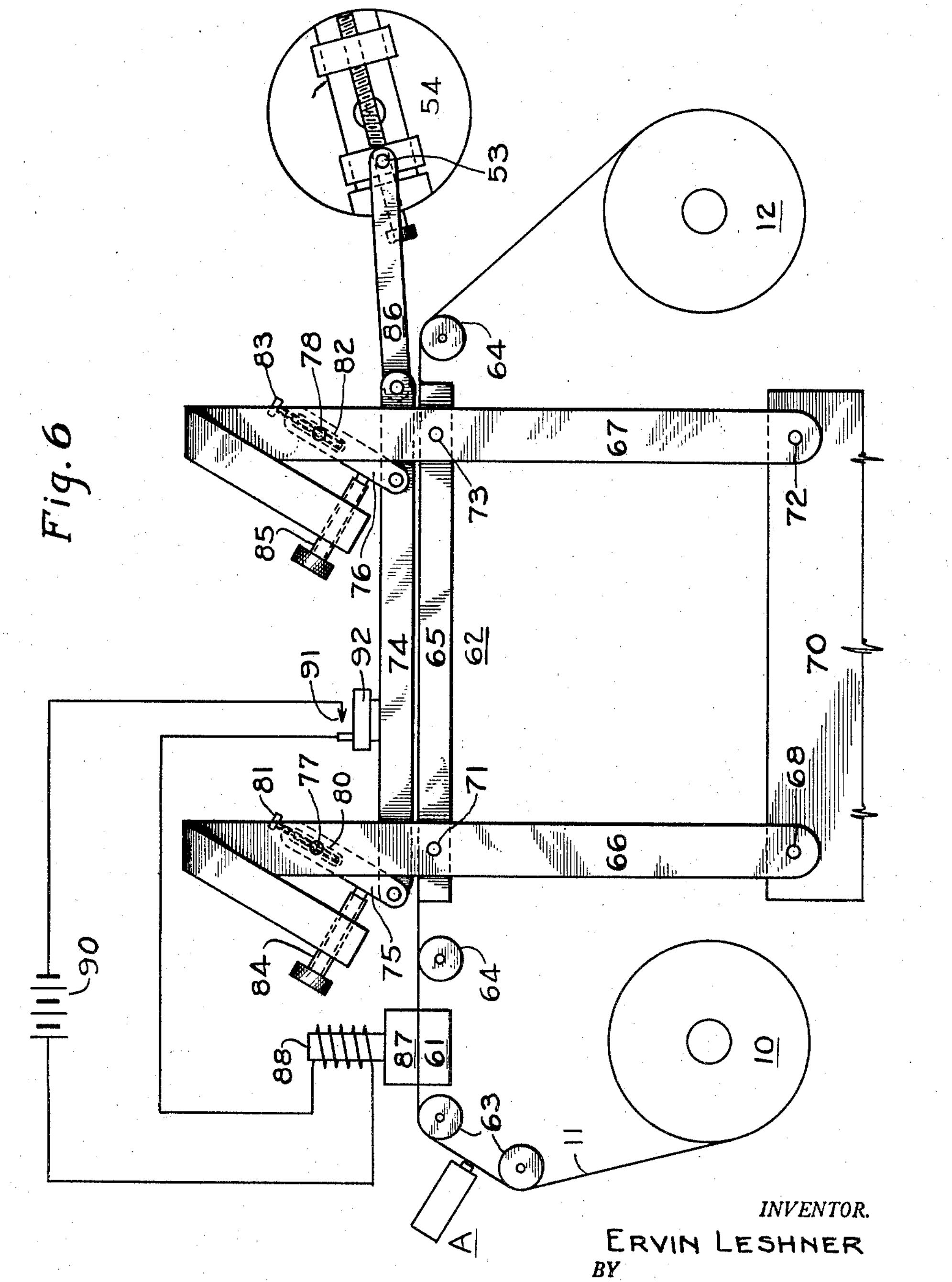
Fig. 6 is a schematic elevation view of a modification of the invention.

In the form of the invention shown in Figure 6 the tape 11 leaves the feed reel 10 to travel horizontally successively past a recording station A, a clamping shoe 61, and a clamping feed unit 62 for delivery to the driven take-up reel 12. Suitable guide rollers 63 position the tape for accurate association with the station marking device, while spaced rollers 64 guide the tape through the unit 62.

For step feed of the tape the unit 62 comprises a platen 65 supported by two upwardly disposed arms 66 and 67, the former being mounted for rocking movement about a pivot 68 projecting laterally from a fixed base 70, and also pivoted at 71 to the platen 65, while the latter 67 is mounted for rocking movement about a pivot 72 projecting laterally from the same base 70, and is also pivoted to the platen 65 at 73. Thus the two arms 66 and 67 swinging on equal radii will shift the platen 65 horizontally as a unitary frame for a step feeding as will be explained.

For carrying out this step feeding a reciprocable bar or block 74 is pivoted at opposite ends respectively upon angularly disposed depending links 75 and 76, which in turn are suspended respectively from pivots 77 and 78 fixed to the upper ends of the respective arms 66 and 67. Both links 75 and 76 are mounted for lengthwise adjustment to properly set the block 74 with respect to the platen 65 for precise gripping of the tape. Thus the link 75 receives the pin 77 in a lengthwise slot 80 and mounts an adjusting screw 81 bearing upon the pivot pin 77. Likewise the link 76 receives the pin 78 in a lengthwise slot 82 and mounts an adjusting screw 83 bearing upon the pin 78. By adjusting the two screws 81 and 83 the two links can be coordinated for common radial lengthwise swing. Since the block 74 is a reciprocable member, adjustable stops 84 and 85 are provided to limit the return stroke of the block 74, such stops respectively being located in the paths of the two links as will be understood.

Figure 5:
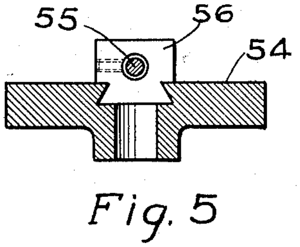
Fig. 5 is a section on line 5—5 of Fig. 3.

For reciprocating the block 74, it is pivotally connected at one end to an arm 86 arranged to be operated by an eccentric assembly, which is preferably that described for the feeding mechanism of Figure 1, and shown in Figures 3, 4 and 5. Thus the arm 86 will be driven by the eccentric pin 53, utilizing the micrometer eccentric adjustment. On the feeding stroke the block 74 is swung downwardly by the links 75 and 76 to grip the tape against the platen 65 which latter then follows the block 74 so that an increment of tape is pulled from the supply source, because this gripping assembly swings as a unit about the pivots 68 and 72. The increment length is predetermined by the setting of the eccentric assembly. The foregoing describes one means for gripping the tape at one location and feeding an increment of tape.

For gripping the tape at another location to carry out the step-by-step control whereby marking of the tape takes place when the tape has stopped, a clamp block 87 is mounted for movement towards and away from the shoe 61, so that in one position the block 87 grips the tape to stop the feed and in the other position moves away to release the tape. As here shown the block 87 is actuated by a solenoid 88 included in a control circuit having a source of voltage 90 and a switch 91 arranged to be controlled by the movement of the block 74. For this purpose the block 74 carries a trip 92 positioned to open the switch on the tape feeding stroke and to close the switch on the idle stroke and energize the solenoid 88 to cause the block 87 to grip the tape against the shoe 61 and stop the feed for a marking operation.

In this modification of the invention the reciprocating means for the block 74 may operate continuously or at timed intervals depending upon the type of marking mechanism with which the tape is to be used. On the working stroke of the block 74, the links 75 and 76 shift the block 74 to grip the tape against the platen 65 whereupon the latter with its pivoted arms follows the movement of the block 74 to draw out an increment of tape in accordance with the setting of the eccentric assembly. On the return stroke of the block 74 the tape is released and permits the withdrawn length to be removed. When this occurs the trip 92 engages the switch 91 to close the circuit, energize the solenoid 88 and clamp the tape between the shoe 61 and the block 87 for a marking operation. Following the marking the block 74 begins its gripping stroke by moving the trip 92 to open the switch 91 so that the block 87 is released and the tape free for a drawing stroke and the cycle repeats.

It will now be apparent that a novel intermittent feed for metering tape at high speeds has been devised primarily, but not necessarily, for use in association with a marking unit which may be in the form of printing, punching, magnetic applied data, code signals, or other markings. Further it will be seen that the acceleration and deceleration of the tape follows the harmonic motion of the eccentric drive, thereby keeping stress on the tape to a minimum when starting to pull and avoiding overrunning of the tape due to its own inertia. The eccentric throw can be adjusted to very fine limits (.001") by the lead screw on the eccentric slide. Also the balance weight on the eccentric is adjustable to balance out any vibration in the device.

What is claimed is:

1. A mechanism for feeding tape past a marking device comprising, in combination, a source of tape feed, first clamping means arranged when operated to grip the tape at one location, a second clamping means arranged when operated to grip the tape at a second location, means at a third location between the locations of said clamping means for drawing a measured length of tape through said first clamping means when the latter is in non-gripping relation to the tape and said second clamping means is gripping said tape, means for withdrawing said measured length of tape from between said first and second locations when said second clamping means is in a non-gripping relation to the tape and said first clamping means is gripping said tape, means for alternately operating the two clamping means, and means for operating said drawing means in timed relation to the operation of the gripping means so that a measured length of tape is drawn through the non-gripping one of the two clamping means, said last mentioned operating means being constituted by a member rotatable about an axis, a link operatively connected at one end to the drawing means, a combined eccentric mounting and counter-balancing weight carried by the rotatable member and capable of radial adjustment such that adjustment of the eccentric mounting is balanced by an equally proportional radial adjustment of the weight, and means connecting the opposite end of said link to said eccentric mounting whereby adjustable lengths of tape are withdrawable from the mechanism.

2. A mechanism for feeding tape past a marking device comprising, in combination: a source of tape feed; a first clamping means arranged when operated to grip the tape at one location; a second clamping means similar to said first clamping means and arranged when operated to grip the tape at a second location; each of said clamping means comprising a fixed member having a planar surface area, a movable member having a planar surface area opposed to the planar surface area on said fixed member and cooperating therewith when operated to grip and hold said tape, and means to guide said tape across the planar area thereon in a plane parallel with and closely adjacent to said planar surface area; means at a third location between the two locations of said clamping means for drawing a measured length of tape through said first clamping means when the latter is in non-gripping relation to the tape and said second clamping means is gripping said tape; means for withdrawing said measured length of tape from between said first and second locations when said second clamping means is in non-gripping relation to the tape and said first clamping means is gripping said tape; means for alternately operating the two clamping means; and means for operating said drawing means in timed relation to the operation of said clamping means so that a measured length of tape is drawn through the non-gripping one of the two clamping means; said last mentioned operating means being constituted by a member rotatable about an axis, a link operatively connected at one end to the drawing means, a combined eccentric mounting and counter-balancing weight carried by the rotatable member and capable of radial adjustment so that adjustment of the eccentric mounting is balanced by an equally proportional radial adjustment of the weight, and means connecting the opposite end of said link to said eccentric mounting whereby the length of tape withdrawable from the source of tape feed is adjustable.

3. A mechanism for feeding tape past a marking device comprising, in combination: a source of tape feed; first clamping means arranged when operated to grip the tape at one location; a second clamping means similar to said first clamping means and arranged when operated to grip the tape at a second location; each of said clamping means comprising a fixed member having a planar surface area faced with a friction pad affording a planar friction area, a movable member having a planar surface area faced with a friction pad affording a planar friction area opposed to the friction area on said fixed member and cooperating therewith when operated to grip and hold said tape, and a roller positioned on each opposite side of said fixed member in the direction of the tape advancement to guide said tape across the friction pad thereon in a plane parallel with and closely adjacent to the surface of said friction pad; means at a third location between the two locations of said clamping means for drawing a measured length of tape through said first clamping means when the latter is in non-gripping relation to the tape and said second clamping means is gripping said tape; means for withdrawing said measured length of tape from between said first and second locations when said second clamping means is in non-gripping relation to the tape and said first clamping means is gripping said tape; means for alternately operating the two clamping means; said last means including means urging one of said movable members toward its associated fixed member and including a resilient element providing self-adjustment of the pressure applied to grip said tape at one of said locations, and cam means to move the other of said movable members away from its associated fixed member thus to release said tape at the other of said locations; and means for operating said drawing means in timed relation to the operation of said clamping means so that a measured length of tape is drawn through the non-gripping one of the two clamping means; said last mentioned operating means being constituted by a member rotatable about an axis, a link operatively connected at one end to the drawing means, a combined eccentric mounting and counter-balancing weight carried by the rotatable member and capable of radial adjustment such that adjustment of the eccentric mounting is balanced by an equally proportional radial adjustment of the weight, and means connecting the opposite end of said link to said eccentric mounting whereby the length of tape withdrawable from the mechanism may be adjusted.

References Cited in the file of this patent

UNITED STATES PATENTS

| | | |
|---|---|---|
| 1,437,949 | Sherman et al. | Dec. 5, 1922 |
| 1,737,204 | Spiess | Nov. 26, 1929 |
| 1,749,505 | Pierce | Mar. 4, 1930 |
| 1,941,597 | Cavagnaro | Jan. 2, 1934 |
| 1,946,874 | Nicholas | Feb. 13, 1934 |
| 2,263,721 | De Lorme | Nov. 25, 1941 |